United States Patent [19]

Bardi et al.

[11] Patent Number: 6,148,748

[45] Date of Patent: Nov. 21, 2000

[54] IN-LINE SEED TREATING UNIT FOR AIR SEEDERS

[75] Inventors: Danick J. Bardi, Saskatoon; Stephen M. Bardi, Elrose; Jim P. Weibe, Warman; Calvin K. Greenstein, Saskatoon; Ted M. Scriber, Lloydminster, all of Canada

[73] Assignee: Flexi-Coil Ltd., Saskatoon, Canada

[21] Appl. No.: 09/315,727

[22] Filed: May 21, 1999

Related U.S. Application Data

[60] Provisional application No. 60/086,519, May 22, 1998.

[51] Int. Cl.⁷ ..................................................... B05B 17/00
[52] U.S. Cl. ............................ 111/174; 111/905; 118/303
[58] Field of Search ............................ 118/303; 111/174, 111/905

[56] References Cited

U.S. PATENT DOCUMENTS

| | | |
|---|---|---|
| 1,409,564 | 3/1922 | Mitchell . |
| 3,118,459 | 1/1964 | Stumpf ................................. 118/303 X |
| 3,460,492 | 8/1969 | Dickinson, III et al. ........... 111/905 X |
| 3,605,688 | 9/1971 | Heden et al. ............................ 118/303 |
| 3,606,860 | 9/1971 | Dunn, Jr. ............................ 118/303 X |
| 3,953,002 | 4/1976 | England, Jr. et al. ...................... 259/4 |
| 3,976,030 | 8/1976 | Ragsdale et al. ........................ 118/303 |
| 4,027,624 | 6/1977 | Motoyama ............................... 118/303 |
| 4,116,163 | 9/1978 | Torelli et al. ............................ 118/303 |
| 4,141,316 | 2/1979 | Grun ........................................ 118/303 |
| 4,191,224 | 3/1980 | Bontrager et al. .................. 118/303 X |
| 4,272,935 | 6/1981 | Lukas et al. ........................ 118/303 X |
| 4,356,934 | 11/1982 | Knake ...................................... 221/926 |
| 4,363,285 | 12/1982 | Yoshida et al. ...................... 118/303 X |
| 4,394,845 | 7/1983 | Porter et al. ............................ 118/303 |
| 4,586,459 | 5/1986 | Schultz .................................... 118/303 |
| 4,644,665 | 2/1987 | Naunapper et al. ................. 118/303 X |
| 4,689,249 | 8/1987 | Thygesen ............................ 118/303 X |
| 4,895,106 | 1/1990 | Barnes .................................... 118/684 |
| 4,895,733 | 1/1990 | Imanidis et al. .................... 118/303 X |
| 4,967,688 | 11/1990 | Funakoshi et al. ...................... 118/303 |
| 4,987,850 | 1/1991 | McCracken ............................. 118/303 |
| 5,085,170 | 2/1992 | Hüttlin .................................... 118/303 |
| 5,096,744 | 3/1992 | Takei et al. ......................... 118/303 X |
| 5,119,756 | 6/1992 | Norton .................................... 118/407 |
| 5,236,507 | 8/1993 | Brown ................................. 118/303 X |
| 5,284,678 | 2/1994 | Hirschfeld et al. ................. 118/303 X |

FOREIGN PATENT DOCUMENTS

| | | |
|---|---|---|
| 2 717 095 | 7/1978 | Germany . |
| 1 169 544 | 7/1985 | U.S.S.R. . |

Primary Examiner—Christopher J. Novosad
Attorney, Agent, or Firm—Larry W. Miller; J. William Stader

[57] ABSTRACT

An in-line seed treating unit is provided for an air seeding implement to coat seeds carried by a flow of air through a product distribution line before being planted into the ground. The in-line seed treating unit includes a cylindrical housing having input and outlet ends located at opposing axial ends of the cylindrical housing to provide a generally linear overall flow path for the seed entrained air flow through the product distribution line. A baffle formed as a spiral flighting with an open center portion is disposed within the cylindrical housing to induce the air flow and entrained seeds in a spiral flow path along the housing axis and, thereby pushing the entrained seeds outwardly toward the inner wall of the housing. The seed treatment material is injected through an injection port located a distance less than one flighting pitch of the baffle from the beginning of the flighting so that the seed treatment material is dispersed within the air flow to coat the entrained seeds. Preferably, the in-line seed treating unit is formed as a modular component that can be inserted into any selected product distribution line on the air seeding implement.

16 Claims, 8 Drawing Sheets

IN-LINE SEED TREATING UNIT FOR AIR SEEDERS

CROSS-REFERENCE TO RELATED APPLICATIONS

This application claims domestic priority on U.S. Provisional Patent Application Ser. No. 60/086,519, filed May 22, 1998.

BACKGROUND OF THE INVENTION

This invention relates generally to agricultural planting equipment, commonly referred to as air seeders, and, more particularly, to a mechanism for coating an airborne stream of small granular items such as seed, with substances in liquid or powdered form.

Seed treatment devices are known in the agricultural industry, as is reflected in Applicant's co-pending U.S. patent application Ser. No. 08/794,884, filed Feb. 5, 1997, and entitled "Application of Coatings to Seeds, Etc.". This seed treating mechanism is positioned generally remotely of the tanks in which the seed to be treated is transported over the field. The seed treating unit receives the flow of seed from the air transport system, treats the seed in a cyclonic chamber and discharges the seed to the ground engaging units in the air flow to be planted into the ground.

Treatment of the seeds remotely of the transport tanks enables the operator to handle only untreated seed, such that no special precautions are necessary. The seed is coated with the desired treatment only immediately before being planted into the ground. One example of the treatment of seeds involves the coating of the seeds with treatment fluids such as inoculants or fungicides within a seed delivery stream between a seed storage tank and a ground-engaging tool.

Another aspect of the instant invention provides a convenient and efficient method of coating particles within the parameters of an air cart.

As used with respect to the instant invention, the term "treatment fluid" is intended to cover both liquid and flowable solid or powdered substances that are introduced to the untreated seed as a coating thereto. Such coating material can be in the form of insecticides, herbicides, trace elements, inoculants and fungicides. The term seed is used in reference to the discrete seed particles that are to be or have been coated; however, the term is intended to cover other types of particles that may benefit from coating using the disclosed inventions.

Known seeding implements, such as described in the aforementioned co-pending U.S. patent application Ser. No. 08/794,884, carry seeds from a storage facility, such as a tank, to a ground-depositing tool by means of a flow of air. The flow of air is typically generated by a fan or compressor that is mounted on the seeding implement. Seeding implements, generally termed air carts or air seeders, are known in the industry that consist of one or more tanks for holding seed and or fertilizer, an air source such as a fan, and a metering and manifold system for delivering particles from the tank into one or more air streams.

Typical known seed coating processes for coating seeds have generally been carried out on an in-factory basis. That is to say, machinery is provided in which, for example, seeds are mixed with a coating material in a fluidized bed arrangement. Because the coating process is carried out in-factory, it is a relatively easy matter to ensure good quality control, especially as regards the thickness of the coating, and as regards the evenness of the thickness, over the seed, and seed to seed. When the coating is factory-applied, inevitably a long time must elapse between the application of the coating and the insertion of the seed into the ground.

Generally, the factory-applied seed coating cannot include moisture, as moisture might cause the seeds to deteriorate or even to germinate, the former never being desirable and the latter not being desirable before being planted into the ground. Often, however, it would be advantageous if a moisture content could be included in the coating, especially if the moisture were applied immediately before being inserted into the ground as the moisture could facilitate germination of the seed.

Another known method of coating seed is the mixing of batches of seed with treatment fluid on the farm prior to placing the seed in the air cart tank. This system is inefficient and requires the operator/farmer to handle the coated seed in some manner. Seed coated in this manner must be used within a limited time frame of when it is coated, and thus coated-seed not planted within a given time frame becomes wasted. This translates to losses due to the costs of wasted seed and wasted treatment fluids. This method also requires cleanup of the air cart tanks and loading equipment after treated seed is handled.

For the system described in the aforementioned co-pending U.S. patent application Ser. No. 08/794,884, the primary goal is to provide a system for applying a desired coating to the seeds on the air seeder immediately prior to insertion into the ground, whereby the seeds are inserted in the ground only a second or two after being coated. As a result, only the required number of seeds are coated, moisture need not be excluded, and all in all a greater freedom of choice of coating substances becomes available. Furthermore, wet or sticky materials can be added to the list of possible coating substances.

An important requirement is that the seed be coated evenly, not only over the surface of each seed particle, but also from seed to seed. Accordingly, an important goal would be the application of the coating to the seeds without compromising evenness and controllability of the coating, even though the coating operation is done actually on the air seeder, and takes place even as the operation of seeding is being carried out.

Improvements to the seed treating mechanism described in the aforementioned co-pending U.S. patent application Ser. No. 08/794,884 are desired and are reflected in the instant patent application.

SUMMARY OF THE INVENTION

It is an object of the instant invention to provide a mixing chamber design to enhance the treatment of seeds on the air seeder before the seed is inserted into the ground.

It is another object of this invention to provide a modular design such that the seed treating mechanism will enable treatment of the seed within an air stream that accommodates several different seeding options.

It is still another object of this invention to provide a seed treatment system that can be mounted as an integral part of an air cart, particularly within the air cart manifold.

Using the improved seed treatment system design described below to treat seed in the air manifold after it has been metered into the air stream from the cart tank has several advantages, including:

1. The tank and metering systems of the air cart remain clean because treatment fluids do not come into contact with the tank or metering components.

2. Seed is treated in the air stream on its way to the planting implement. Thus the time lag between when the seed is treated and when it is in the furrow is a matter of seconds. The treatment is fresh, moisture levels are maintained, and wasting of treatment and seeds is reduced.

3. The seed treatment system can be offered as an option on an air cart rather than on a planting implement—thus it can be used with a variety of planting implements rather than being limited to the one it is mounted on.

4. The treatment unit can be offered in a variety of positions within the air cart manifold to enable different uses of the cart tanks. The mixing unit design lends itself well to a modular system that can be installed by the farmer in different locations on the air cart depending on the cart configuration. Due to reduced space requirements, the options for mixing unit locations are numerous. A modular system enables the farmer to change the cart after usage, permitting the same air cart to be used for a variety of planting situations.

5. The treatment chamber provides a gentle option for treating seeds that has a low pressure drop across it. Seeds are coated efficiently with minimal damage. Impact on the air cart fan system is minimized.

6. The treatment chamber does not contain any moving parts and thus the seed treatment system has low maintenance requirements.

7. The treatment system enables the treating of small volumes of seed, without incurring substantial waste.

The mixing module concept disclosed herein has potential to be very important to the agricultural industry. An air cart can be designed to readily accept placement of mixing unit modules in a variety of places within the manifold. The modules can be relatively small and easy to install and replace. For best efficiency, different modules can be provided for different seed types, such that the internals of the mixing unit are varied depending on the seed size and shape. Thus a typical farm operation might have a single air cart with a few different sets of mixing modules to give the farmer a number of seeding and fertilizing alternatives.

The invention utilizes a new in-line mixer design. Typical in-line mixers known have internal baffles designed to repeatedly split and recombine the flow to mix two or more elements within a stream. The methods used for splitting the flow are too aggressive for the coating of seeds and can lead to seed damage. The in-line mixer of the invention is new in that it does not split and recombine the flow, but instead it encourages particles, usually seeds, to roll along the same path as the coating material with which it is to be mixed. The purpose of the inventive mixer is more to coat the particles with the treatment fluid, rather than to simply mix two elements. The in-line mixer of the invention induces the particles to travel along a spiral path on the internal wall of the mixing chamber. The spiral trajectory increases the mixing path length within a straight unit length of pipe or tube, thus mixing time is increased. The pressure of the carrying fluid is enough to coat each particle with the treatment fluid.

The typically known in-line mixers are additionally undesirable for mixing seed with treatment fluids due to the demands they place on the air pressure system. A typical in-line mixer that splits and recombines flow has a higher pressure-drop across it than a typical air pressure system on an air cart can handle. If a pressure drop across a mixer is too high there is not enough pressure in the stream to effectively carry the particles from the mixer to the implement ground engaging tools. The in-line mixer design of the invention provides efficient mixing with minimized pressure drops—thus the impact on the cart air system is greatly reduced.

These and other objects, features and advantages can be accomplished according to the instant invention by providing an in-line seed treating unit for an air seeding implement to coat seeds carried by a flow of air through a product distribution line before being planted into the ground. The in-line seed treating unit includes a cylindrical housing having input and outlet ends located at opposing axial ends of the cylindrical housing to provide a generally linear overall flow path for the seed entrained air flow through the product distribution line. A baffle formed as a spiral flighting with an open center portion is disposed within the cylindrical housing to induce the air flow and entrained seeds in a spiral flow path along the housing axis and, thereby pushing the entrained seeds outwardly toward the inner wall of the housing. The seed treatment material is injected through an injection port located a distance equal to at least one flighting pitch of the baffle so that the seed treatment material is dispersed within the air flow to coat the entrained seeds. Preferably, the in-line seed treating unit is formed as a modular component that can be inserted into any selected product distribution line on the air seeding implement.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
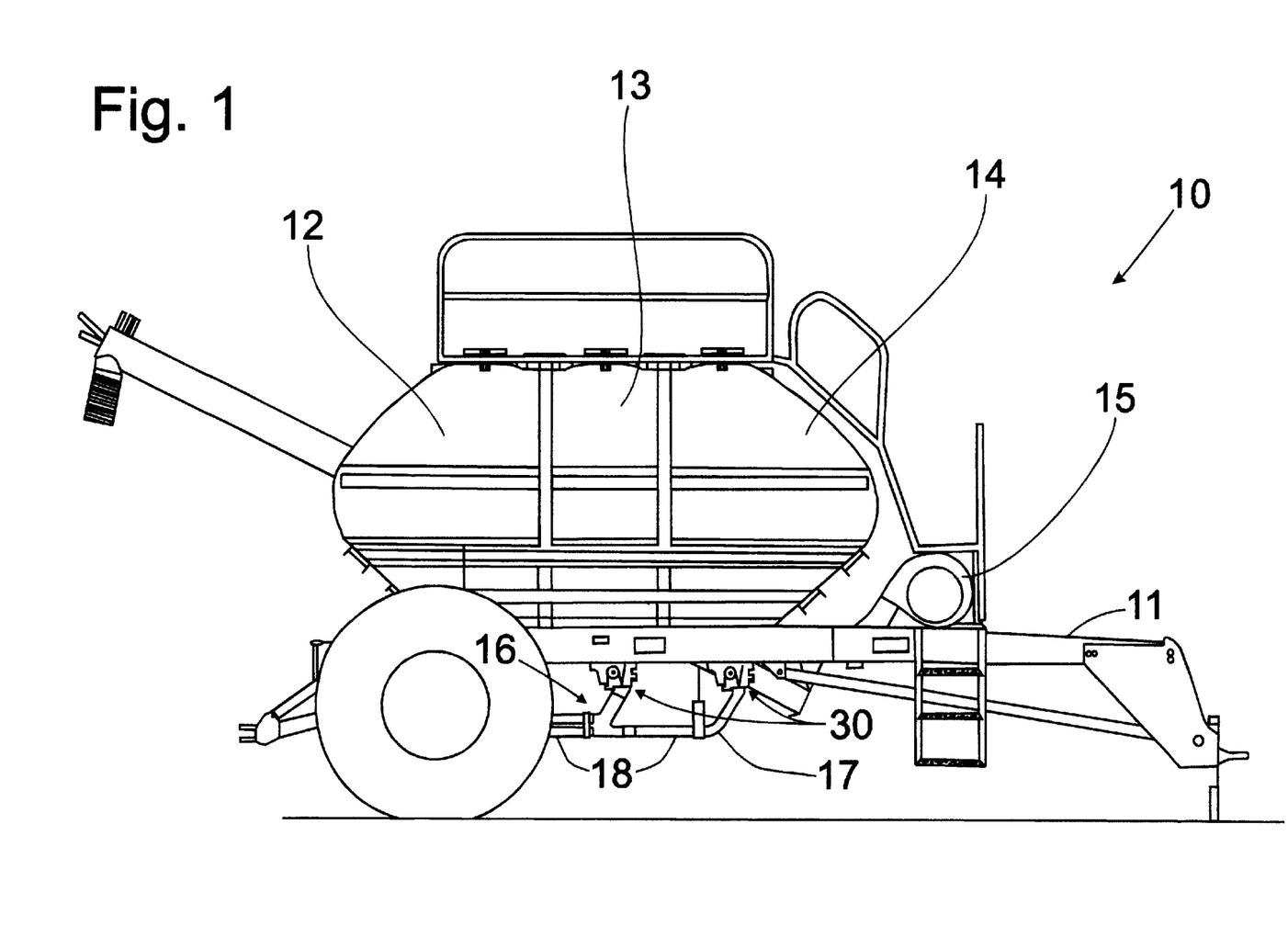
FIG. 1 is a side elevational view of a typical known air cart upon which the seed treating system incorporating the principles of the instant invention might be placed.

An air seeder of the type on which the instant invention can be utilized is shown in FIG. 1. The general principles of an insitu seed coating apparatus in found in co-pending U.S. patent application Ser. No. 08/794,884, filed Feb. 5, 1997, and entitled "Application of Coatings to Seeds, Etc.", the descriptive portions of which are incorporated herein by reference. The air seeder 10 is generally provided with a wheeled frame 11 on which are supported two to three tanks 12–14 in which seed particles and/or fertilizer are stored for utilization as the air seeder 10 is transported over the ground by a prime mover, such as a tractor (not shown). The air seeder 10 includes a fan 15 that creates an air flow through a conduit system 16 into which the particulate material, such as the seed and fertilizer, is metered and fed to be transported to ground engaging tools that place the seed into the ground.

The air flow from the fan 15 is channeled through air flow tubes 17, also referred to as conduits or runs, to convey material from the tanks 12–14 to the ground engaging tools. The number of primary runs in the air cart manifold depends on the width of the seeding implement. A typical number of runs is eight, but the number can vary substantially. Each run goes to a separate section of the implement where it is divided to multiple ground engaging tools 5. For purposes of clarity, the Drawings only depict one run.

FIG. 1 represents a typical air cart 10 on which the mixing unit 20 may be utilized. The example shown has three tanks, designated 12, 13, 14, for holding particles such as seed and or fertilizer. Metering systems 30 below the tanks 12–14 direct particles from the tanks 12–14 into the manifold 18 below the tanks. An air supply system, in this case a fan 15, provides pressurized air to the manifold 18. The pressurized air carries the particles through a distribution system 19 from the manifold 18 to ground engaging tools 5.

Figure 8:
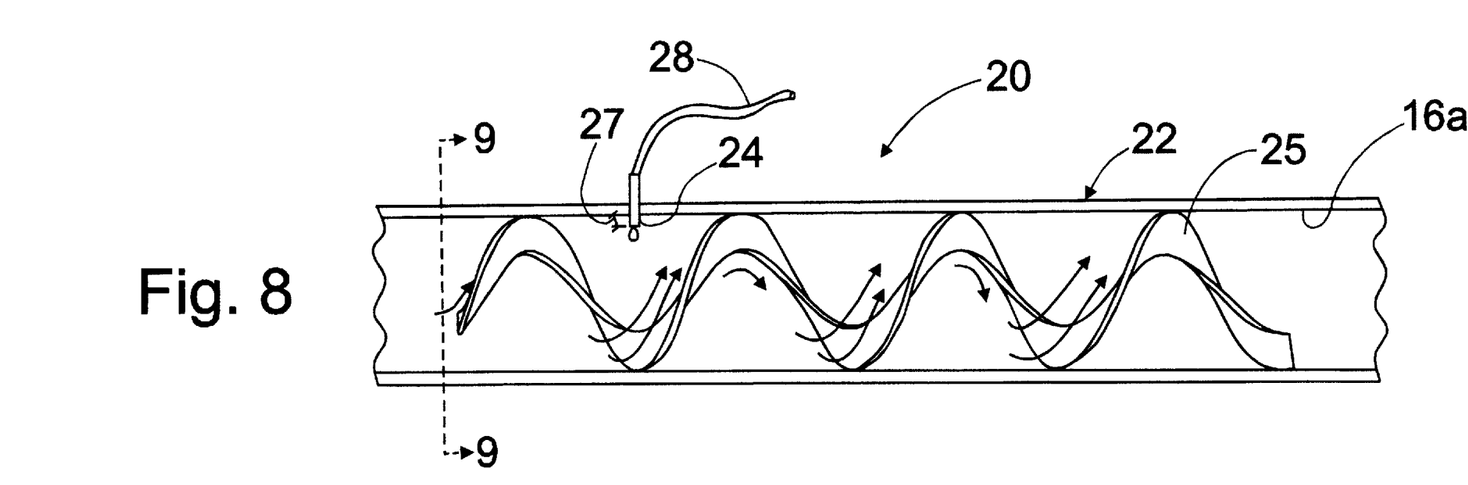
FIG. 8 is a diagrammatic cross-sectional view of the mixing unit incorporating the principles of the instant invention, one wall of the chamber tube being removed.
Figure 9:
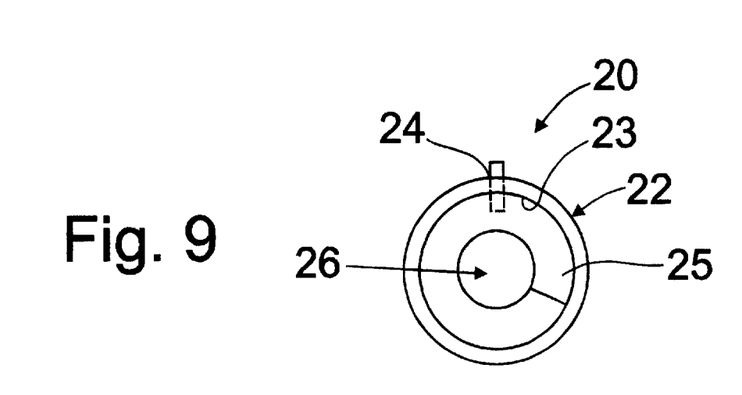
FIG. 9 is a cross sectional view of the mixing unit taken along lines 9—9 of FIG. 8.

The in-line seed treating mechanism 20 is best seen in detail in FIGS. 8 and 9, which depict the internal design of the in-line mixing unit module 22. The in-line mixing chamber 22 is provided with a spiral baffle 25 positioned along the interior wall 16a of a tube 16 that induces mixing with reduced pressure drops and reduced potential for damage to the carried seed particles. The central portion 26 of the spiral baffle 25 is open, allowing the central path of the chamber 22 to be clear. The spiral baffle 25 induces a rotational motion into the flow of the seed particles which pulls the air stream and the particles to the wall area 23 of the mixing chamber 22. The seed particles tend to roll along the wall 23 of the chamber 22 following the baffle 25 in a spiral trajectory. The treatment fluid is injected into the chamber at an injection point 24 such that it flows in a relatively wide stream along the wall 23 and follows the same path as the rolling particles, enabling the seed particles to roll in the stream of treatment fluid and, thereby, become coated by the treatment material.

For the air stream to be utilized for spreading the fluid flow, the injection point 24 must be located after the air stream has been induced to rotate by the baffle 25. The preferred embodiment shown has the fluid injection point 24 located one full pitch length after the start of the baffle 25, i.e. one full rotation of the spiral baffle 25. The injection point 24 is located in the top of the module 22; however, the exact location of the injection point 24 will vary with mixing module type and the treatment fluid to be injected, and could be located as close to the beginning of the baffle 25 as ¼ of a pitch length.

The treatment fluid is preferably injected in the form of a drip or spray at a point sufficiently below the interior wall of the chamber such that it is caught by the rotating air stream and dispersed into a fan-shaped pattern on the side wall of the tube.

The treatment fluid then travels in a relatively broad stream along the same path as the seed particles within the mixing module 22. The injection point 24 in the preferred embodiment shown is located a distance 27 below the top interior surface. The selected distance 27 has an impact on the width of the stream of fluid. If the injection point 24 is too close to the interior wall 23 of the chamber 22, the stream will be too narrow because the air does not interact sufficiently with the stream to force the treatment fluid to spread out. The injection point 22 is fed by a line 28 that is connected to a fluid mixing tank and pump system (not shown).

Due to the centrifugal pull of the seed particle motion, the portion of the air passing straight through the open center of the chamber 22 does not carry a significant number of particles. In testing, the particles have been found to be treated with good uniformity, thus substantially all of the particles are carried along the wall 23 of the chamber 22. The rotary motion of the particles tends to pull the air stream towards the wall 23; thus most of the air travels along the baffle 25 with the particles.

The pitch, width, and length of the spiral baffle 25 can be varied for different seed types. The baffle embodiment shown is similar to one used for treating peas. The overall length of the baffle 25 can be varied depending on the shape of the seed or particle being treated. Round seeds tend to roll readily and require fewer baffle rotations to encourage them to follow a spiral path with the treatment fluid. The baffle 25 can, therefore, be cut shorter with the round seeds, perhaps to even a half of a rotation of the baffle 25, which reduces the pressure drop across the module 22. Oblong seeds tend to require more baffle rotations to hold them in the spiral path sufficiently long to coat them with treatment fluid; thus the baffle 25 for oblong seeds must be either longer or have a shorter pitch to provide more rotations per length of the baffle 25 and, therefore, the seed treating module 22. Smaller seeds and particles can be induced into a rotary path with narrower baffle widths, enabling the opening in the center 26 to be larger, which reduces the pressure drop across the mixing module 22.

Other modifications of the apparatus 20 are also envisioned within the scope of the instant invention to accommodate different sized or shaped seeds. Canola seed, for example, is very small. It is believed that this in-line seed treating concept can be utilized with canola seed by keeping the baffle thickness the same as for other seeds, but reducing the inside diameter of the tube. This configuration would increase the velocity of the air/seed flow within the in-line seed treating unit 20.

Thus, it is possible to create different modules 22 for different seed types that optimize the performance of each unit in terms of pressure requirements. It is also possible to use the wider baffle size for larger particles to treat small particles effectively. The only drawback to the use of a single module type would be relevant to the pressure drops—the pressure losses across the module 22 still being substantially improved in comparison to other mixing alternatives.

Figure 2:
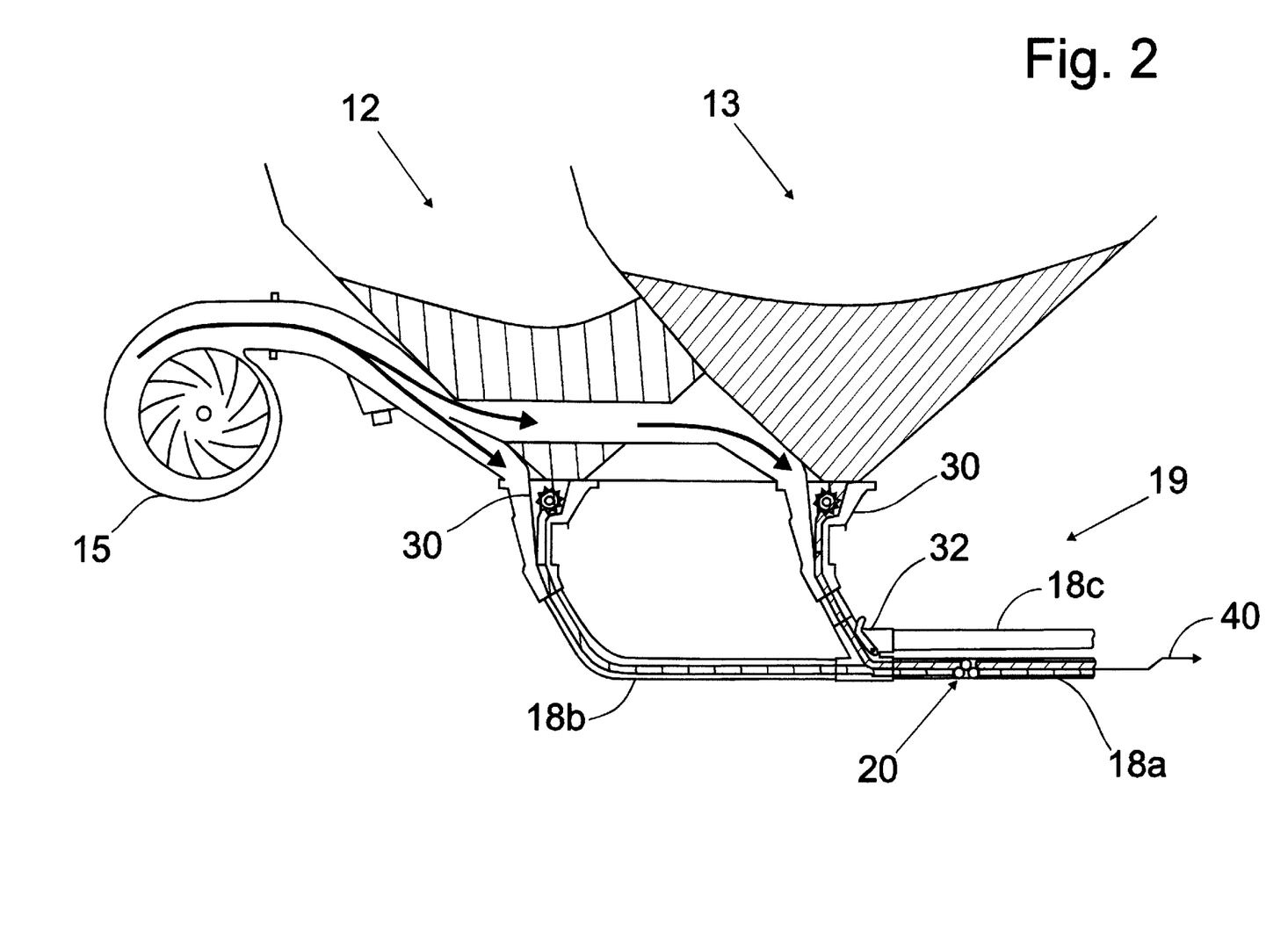
FIG. 2 is a schematic diagram of a portion of the air cart of FIG. 1 incorporating the instant invention into a two-tank air cart configuration with the inventive mixing units in the lower lies of the intermediate manifold, particles from both tanks being directed to the mixing units.
Figure 3:
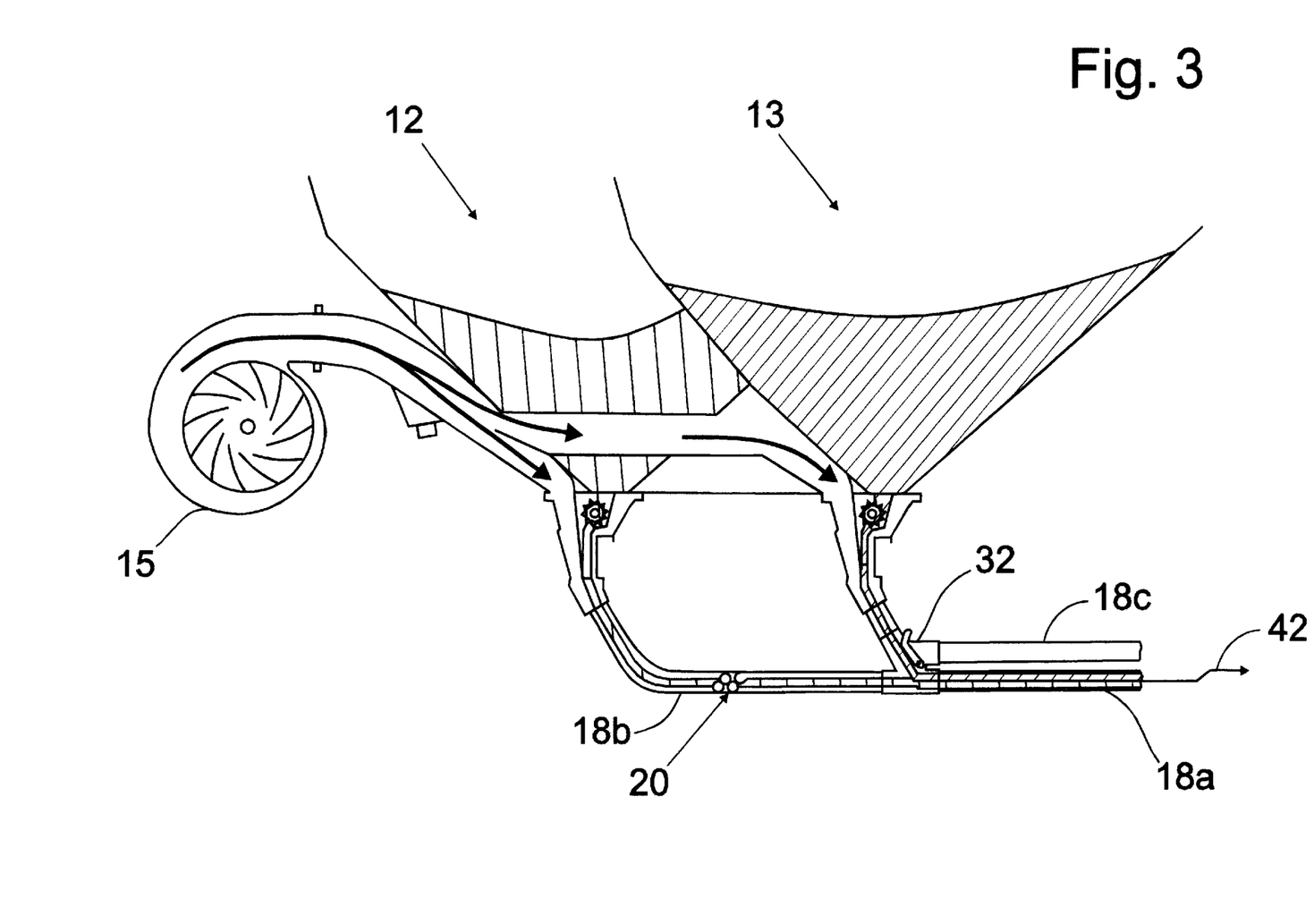
FIG. 3 is a schematic diagram similar to FIG. 2, but depicting a two-tank air cart configuration in which only the first tank carries seed to be coated, the second tank carrying fertilizer, the mixing units being placed in the primary manifold such that the seed particles from the first tank only are directed through the mixing units.
Figure 4:
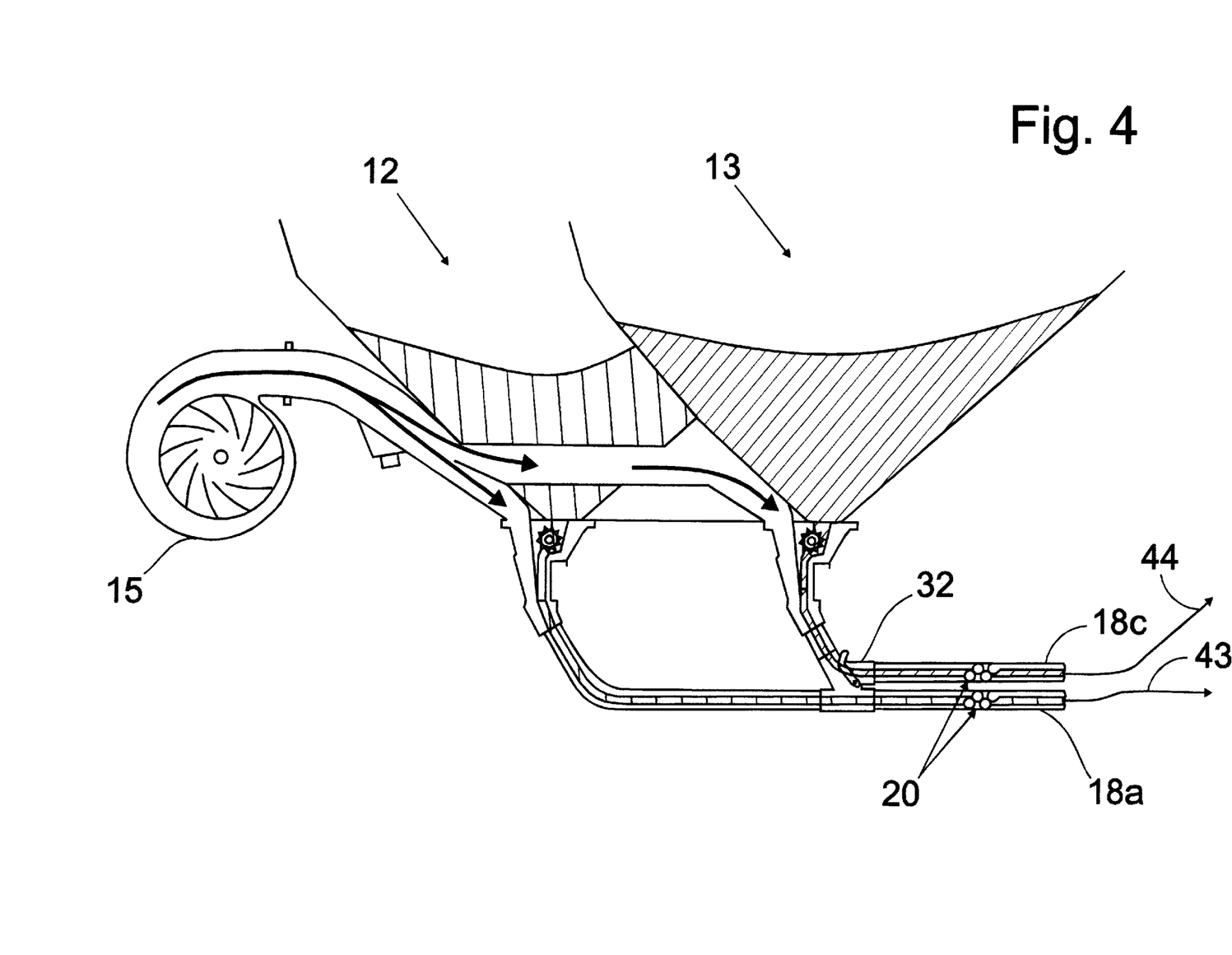
FIG. 4 is a schematic diagram similar to FIG. 2, but depicting a two-tank air cart configuration in which the mixing units are located in either or both of the intermediate manifold lines such that seed particles from either or both tanks are directed through the mixing units.
Figure 5:
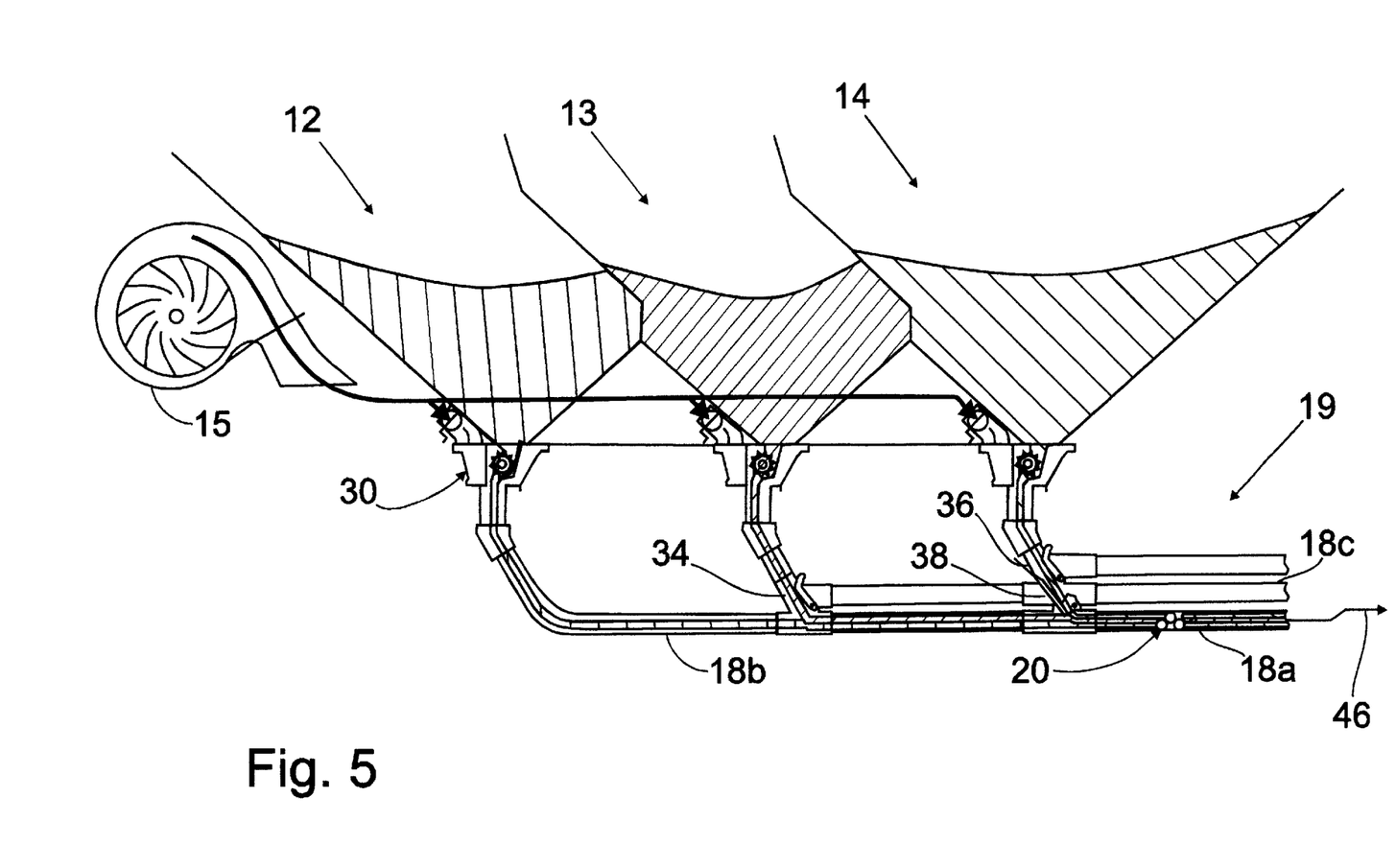
FIG. 5 is a schematic diagram similar to FIG. 2, but depicting a three-tank air cart configuration in which the mixing units are located in the lower lines of the intermediate manifold, seed particles from all three tanks being directed to the mixing units.
Figure 6:
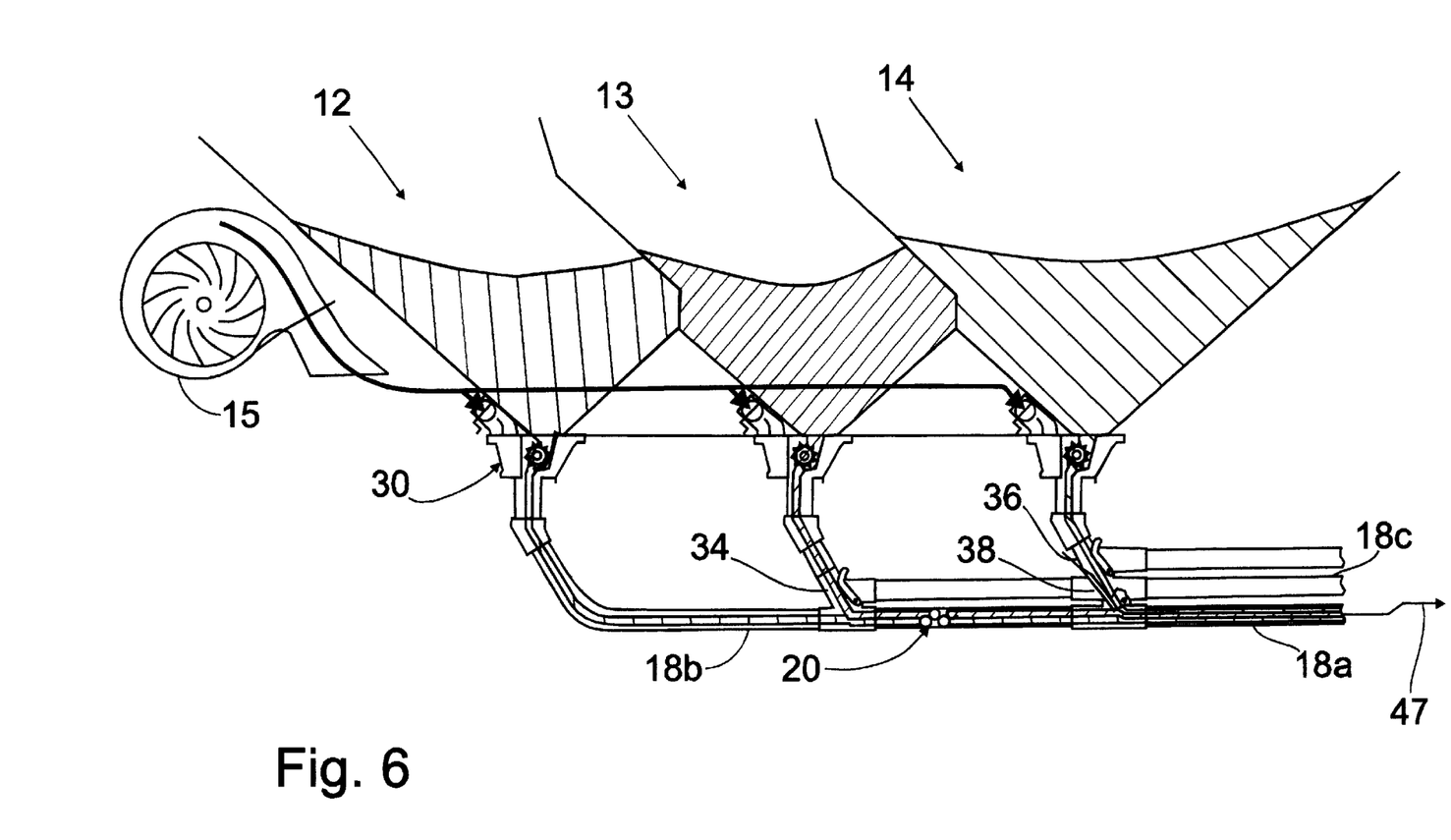
FIG. 6 is a schematic diagram depicting a three-tank air cart system similar to that of FIG. 5, but with mixing units located in the primary manifold between the second and third tanks, such that seed particles from the first and third tanks are directed through the mixing units, particulate material from the third tank being combined into the air flow stream after the seed particles have been treated in the mixing unit.
Figure 7:
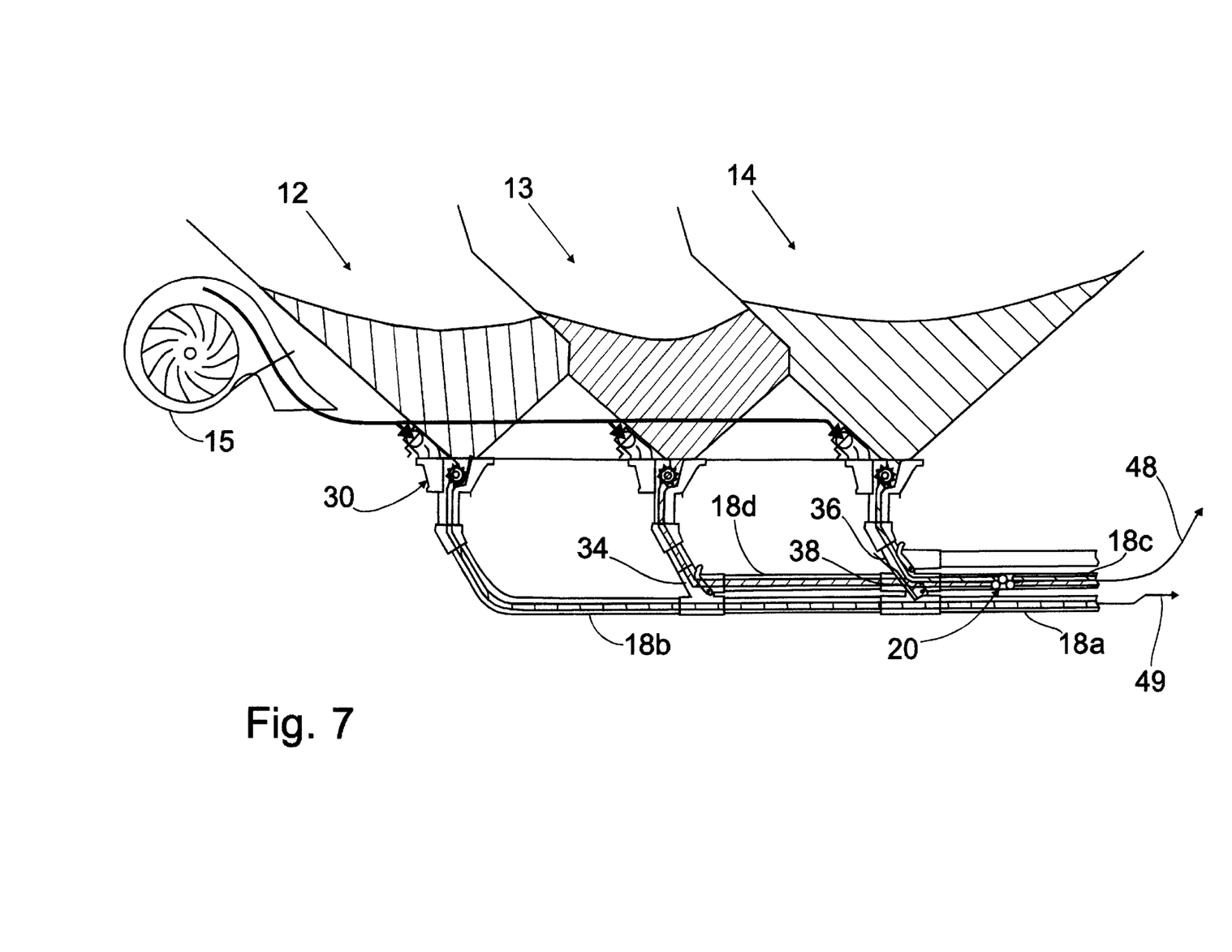
FIG. 7 is a schematic diagram of a three-tank air cart, similar to FIG. 6, but with the mixing units located in the secondary manifold such that particulate material from the first tank bypass the mixing units, and seed particles from the second and third tanks are combined in the air flow and then directed through the mixing unit.

FIGS. 2 through 7 represent some of the possible locations for the in-line mixing unit 20. The ability to place the mixing unit 20 between the cart tanks 12–14, as illustrated in FIGS. 3 and 6, provides a significant improvement due to the size of the mixing unit 20. FIGS. 2 to 4 represent a typical two tank air cart 10 with the mixing unit 20 placed in different positions. FIGS. 5 to 7 represent a typical three tank air cart 10 with the mixing units placed in different positions within the manifold 18. All of the Drawings show the adaptability of the mixing unit 20 to fit within the confines of an existing manifold line 18.

In FIG. 2 seed is metered through a metering mechanism 30 from both tanks 10 and 11. Valve 32 is set such that the seed from tank 11 joins with seed from tank 10 in the manifold bottom line 18a. All seed is directed through the mixing unit 20 located in lower manifold line 18b, and thus seed is coated before traveling in stream 40, represented by an arrow, to the seed distribution system on the implement.

In FIG. 3 the mixing unit 20 is located in the manifold lower line 18*b* such that only seed from tank 12 is coated. Valve 32 is set such that fertilizer from tank 13 mixes with the coated seed and travels through manifold line 18*a*. Stream 42, represented by an arrow, carries coated seed and uncoated fertilizer to the seed distribution system 19 on the implement. Thus seed and fertilizer are placed in the ground together in a single shoot seeding operation.

In FIG. 4 two mixing units 20 are shown in both the bottom manifold line 18*a* and the top manifold line 18*c*. Valve 32 is set such that the particles metered from tank 13 do not mix with the particles metered from tank 12. Thus either seed or fertilizer can be placed in either tank and different treatment fluids can be added to the particles in each mixing unit. For example, stream 43 may contain fertilizer treated with a slow release chemical, and steam 44 may contain seed treated with a fungicide. The particles from each stream 43, 44 are placed into the ground in either different furrows or different portions of the same furrow such that they do not come into direct contact.

FIG. 5 shows valves 34, 36 and 38 set such that seed metered from tanks 12, 13 and 14 are all directed through the bottom manifold line 18*a*. A mixing unit 20 is located in line 18*a* such that stream 46 carries treated seed from all of the tanks 12–14 to the distribution system 19 on the implement.

FIG. 6 shows valves 34, 36 and 38 set in the same manner as shown in FIG. 5. The mixing unit 20 is located in the lower manifold line 18*b* between the tanks 13 and 14 such that only the particles metered from tanks 12 and 13 are coated. Thus, fertilizer, or other particles the operator doesn't want coated, can be metered into the bottom manifold line 18*a* after the mixing unit 20. Stream 47 typically carries a combination of coated seed from tanks 12 and 13 and uncoated fertilizer from tank 14 to the distribution system 19 on the implement.

FIG. 7 shows valves 34, 36 and 38 set such that particles from tanks 13 and 14 combine in the middle manifold line 18*d*, and particles from tank 12 are kept separate in the bottom manifold line 18*b*. The mixing unit 20 is located in the middle manifold line 18*d* so that stream 48 carries coated particles, typically seed, through a distribution system 19 to specific furrows formed in the ground. Stream 49 carries particles from tank 12, typically fertilizer, to alternate locations in the ground such that they do not come into direct contact with the stream 48 particles.

A significant advantage to being able to move the mixing unit module 22 is that some particles do not benefit from addition of treatment fluid while others do. Typically it is not desirable to mix treatment fluid with fertilizer particles, while it is desirable to mix treatment fluid with seeds. Fertilizer is not mixed with most treatment fluids for a variety of reasons. Many treatment fluids are very expensive, and it would not be cost effective to treat fertilizer particles unnecessarily. Several fertilizer types are hygroscopic and readily absorb water, and thus, their properties change when they are mixed with treatment fluid such that they become difficult to transport within an air system. Testing of the mixing unit 20 has shown that the treated particles absorb enough of the treatment fluid within the mixing module 22 such that fertilizer added downstream of the module 22 does not noticeably change.

The design of the mixing module 22 is such that the liquid dilution of the treatment fluid can be reduced in comparison to the amount of liquid required for mixing using prior art treatment chambers.

With some ground opener and seed/fertilizer combinations it is desirable to place the seed and fertilizer together in the same furrow. In this situation seed from one air cart tank and fertilizer from another air cart tank are combined into a single air stream per run—this process is commonly termed single shoot seeding. Since it is not desirable to coat fertilizer particles with treatment fluid, the seed must be coated prior to mixing with the fertilizer in a single shoot configuration. FIGS. 3 and 6 illustrate the mixing unit in this configuration.

In addition to the cases shown in FIGS. 2 through 7, the mixing unit 20 can be placed in any air/particle delivery line prior to the seeding implement ground tools. Thus the mixing unit 20 can be placed anywhere on either the air cart or on the implement. One embodiment is to place mixing units 20 within the primary delivery lines on an implement prior to splitting the flows in a distribution header. The mixing unit 20 can be designed to accommodate different size air lines and different product flows by varying the internal dimensions of the spiral baffle 25 within.

While the above description of the invention is directed to the preferred embodiment of coating seed particles, one skilled in the art will readily realize that slow release coatings are being developed to treat fertilizers as well. Accordingly, the use of the terms, seed or seed particle, above would also be applicable to fertilizer particles, or other particulate materials that might be applied to the ground during the planting operation.

One skilled in the art will also recognize that the modular concept of in-line seed or particulate treating described above can be configured in a serial orientation, such that more than one coating can be applied to the seed or particulate. Furthermore, the above-described in-line treating apparatus can be used to add a second or subsequent treatment to previously treated seeds or particulates.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an air seeding implement for planting agricultural products into the ground, said air seeding implement having a wheeled frame, a storage tank supported on said frame to contain a supply of agricultural seeds to be planted into the ground; a fan mounted on said frame and being operable to create a flow of air; air flow tubes corresponding to said storage tank and being operably associated with said fan to receive said flow of air, said air flow tubes having a diameter; a metering mechanism to distribute the agricultural seeds into said air flow tubes to be carried by the air flow therein for delivery to a remote location for insertion into the ground; and a supply of seed treatment material, the improvement comprising:

a generally linear seed treating unit connected with at least one of said air flow tubes downstream from said metering mechanism and connected to said supply of seed treatment material to coat said agricultural seeds with said seed treatment material as said agricultural seeds are conveyed generally linearly within said air flow tubes, said seed treating unit including:
a generally cylindrical housing having a diameter substantially equal to the diameter of said air flow tubes and defining an in-line flow path along an axis of said housing, said at least one air flow tube being connected to opposing ends of said housing along said axis;
a baffle within said housing to direct said agricultural seeds within said air flow radially outwardly toward said housing in a spiral flow path along said axis; and
an injection port on said housing connected radially relative to said axis to inject said supply of seed treatment material into said housing at an injection point for mixing within said air flow and coating said agricultural seeds.

2. The air seeding implement of claim 1 wherein said baffle is formed as a spiral flighting defining at least one revolution within said housing.

3. The air seeding implement of claim 2 wherein said injection point is located downstream from a input connection of said air flow tube to said housing at a distance less than one pitch length of said baffle.

4. The air seeding implement of claim 3 wherein said baffle has an open center portion corresponding to said axis of said housing.

5. The air seeding implement of claim 4 wherein said seeding treating unit is a module component that can be inserted in any selected air flow tube.

6. The air seeding implement of claim 5 wherein said air seeding implement is provided with two storage tanks containing a supply of agricultural seeds and another agricultural product for planting in the ground, said seed treating unit being positioned in a manifold line that combines the metered seed and product upstream of said seed treating unit such that both said seeds and said other agricultural product are mixed with said seed treatment material.

7. The air seeding implement of claim 5 wherein said air seeding implement is provided with two storage tanks containing a supply of agricultural seeds and another agricultural product for planting in the ground, said seed treating unit being positioned in an air flow tube corresponding to said storage tank containing said seeds to coat said seeds with seed treatment material before being combined in a manifold line that combines the metered seed and product downstream of said seed treating unit such that only said seeds, and not said other agricultural product, is coated with said seed treatment material.

8. An apparatus for treating seeds on a air seeding implement having a storage tank containing a supply of seeds to be planted into the ground; a fan operable to create a flow of air; an air flow tube operably associated with said fan to receive said flow of air; a metering mechanism to distribute the seeds into said air flow tube to be carried by the air flow therein for delivery to a remote location for insertion into the ground; and a supply of seed treatment material, comprising:

a generally cylindrical housing having an axis with an input end and an outlet end axially located on opposing ends of said housing, said input end being connected to said air flow tube downstream of said metering mechanism, said outlet end being connected to said air flow tube to continue conveying said seeds to said remote location;
a baffle formed as a spiral fighting defining a length of at least one-half of a revolution within said housing to direct said air flow in a spiral path along said axis within said housing; and
an injection port connected with said supply of seed treatment material to introduce said seed treatment material into said housing to be mixed into said air flow for coating said seeds, said injection port being located at a distance less than one-half of the length of said spiral flighting from said input end.

9. The apparatus of claim 8 wherein said apparatus is formed as a module that can be selectively inserted into any air flow tube on said air seeding implement.

10. The apparatus of claim 9 wherein said baffle has an open center portion corresponding to said axis of said housing.

11. The apparatus of claim 10 said air seeding implement is provided with two storage tanks containing a supply of said seeds and another agricultural product for planting in the ground, said apparatus being positioned in a manifold line that combines the metered seed and product upstream of said apparatus such that both said seeds and said other agricultural product are mixed with said seed treatment material.

12. The apparatus of claim 10 wherein said air seeding implement is provided with two storage tanks containing a supply of said seeds and another agricultural product for planting in the ground, said apparatus being positioned in an air flow tube corresponding to said storage tank containing said seeds to coat said seeds with seed treatment material before being combined in a manifold line that combines the metered seed and product downstream of said seed treating unit such that only said seeds, and not said other agricultural product, is coated with said seed treatment material.

13. An air seeding implement for planting agricultural products into the ground, comprising:

a wheeled frame;
a storage tank supported on said frame to contain a supply of agricultural seeds to be planted into the ground;
a fan mounted on said frame and being operable to create a flow of air;
an air flow tube corresponding to said storage tank and being operably associated with said fan to receive said flow of air;
a metering mechanism to distribute the agricultural seeds into said air flow tube to be carried by the air flow therein for delivery to a remote location for insertion into the ground;
a supply of seed treatment material supported on said frame; and an in-line seed treating unit connected to said air flow tube downstream of said metering mechanism and including:
- a generally cylindrical housing having an axis with an input end and an outlet end axially located on opposing ends of said housing, said input end and said outlet end being connected to said air flow tube to provide a generally linear flow path for said air flow;
- a baffle formed as a spiral flighting defining at least two revolutions within said housing to direct said air flow in a spiral path along said axis within said housing; and
- an injection port connected with said supply of seed treatment material to introduce said seed treatment material into said housing to be mixed into said air flow for coating said seeds, said injection port being located at least one pitch length of said baffle from said input end.

14. The air seeding implement of claim 13 further comprising a second storage tank containing a second supply of agricultural seeds for planting in the ground, said in-line seed treating unit being positioned in a manifold line that combines the metered seed from both said storage tanks upstream of said in-line seed treating unit such that the agricultural seeds from both said storage tanks are coated simultaneously.

15. The air seeding implement of claim 13 further comprising a second storage tanks containing a supply of another agricultural product for planting in the ground, said in-line seed treating unit being positioned in an air flow tube corresponding to said storage tank containing said seeds to coat said seeds with seed treatment material before being combined in a manifold line that combines the coated seed and other agricultural product downstream of said seed treating unit such that only said seeds, and not said other agricultural product, is coated with said seed treatment material.

16. The air seeding implement of claim 13 further comprising a second storage tank containing a second supply of agricultural seeds for planting in the ground and a third storage tank containing a supply of another agricultural product to be planted in the ground with said agricultural seeds, said in-line seed treating unit being positioned in a manifold line that combines the metered seed from both said storage tanks that contain said agricultural seeds upstream of said in-line seed treating unit such that the agricultural seeds from both said storage tanks are coated simultaneously, said manifold line receiving said other agricultural product downstream of said in-line seed treating unit.

* * * * *